United States Patent [19]

Moose

[11] 3,781,891
[45] Dec. 25, 1973

[54] AIRCRAFT GLIDE SLOPE INSTRUMENTATION SYSTEM

[76] Inventor: Robert R. Moose, 208 S. Henderson, Caddo, Okla. 74729

[22] Filed: Apr. 17, 1972

[21] Appl. No.: 244,830

[52] U.S. Cl. ....... 343/108 R, 235/150.22, 343/5 LS
[51] Int. Cl. ............................................. G01s 1/16
[58] Field of Search ............................. 343/108 R; 235/150.22

[56] References Cited
UNITED STATES PATENTS 3,181,153    4/1965    Cella ............................. 343/5 LS
3,519,806    7/1970    Lami et al. ..................... 235/150.22

*Primary Examiner*—Benjamin A. Borchelt
*Assistant Examiner*—Richard E. Berger
*Attorney*—William S. Dorman et al.

[57] ABSTRACT

An aircraft glide slope instrumentation system for use with an altimeter means equipped aircraft and a landing strip, the instrumentation system comprising a pair of ground-based transmitter beacons spaced a fixed distance apart, a first direction-finding receiver carried by the aircraft for receiving the output of one of the transmitter beacons and determining the azimuth bearing thereof, a second direction-finding receiver carried by the aircraft for receiving the output of the other transmittter beacon and determining the azimuth bearing thereof, distance computer means carried by the aircraft and operably connected to the two receivers for determining the horizontal distance between the aircraft and the landing strip based on the difference in relative bearing of the two transmitter beacons, altitude computing means carried by the aircraft and operably connected to the distance computer means for determining the desired landing approach altitude of the aircraft at any time during the approach thereof and glide slope display means operably connected to the altitude computing means and the aircraft altimeter means for displaying the difference between the desired landing approach altitude and the true altitude of the aircraft with respect to the landing strip.

14 Claims, 6 Drawing Figures

AIRCRAFT GLIDE SLOPE INSTRUMENTATION SYSTEM

BACKGROUND OF THE INVENTION

1. Field of the Invention:

This invention relates to aircraft glide slope instrumentation systems and more particularly, but not by way of limitation, to an aircraft glide slope instrumentation system utilizing a pair of ground-based non-directional beacon transmitters spaced a known distance apart and a pair of airborne direction finding receivers carried by the aircraft for determining the relative bearings of the two ground-based transmitters and electromechanical means also carried by the aircraft for determining horizontal distance of the aircraft from the landing strip and comparing the true altitude of the aircraft with respect to the desired altitude along the glide slope path at any time during the aircraft approach for landing. The present invention is particularly designed and constructed for providing vertical guidance to an aircraft on final approach to landing which is economical and reliable in construction and simple and efficient in operation.

2. Description of Prior Art:

The installation of conventional glide slope, localizer, marker beacons and approach lights which make up complete instrument landing systems (ILS) glide slope provisions are extremely expensive thereby limiting the installation thereof to relatively large airports. Likewise, the installation of ILS receiving equipment in the individual aircraft is prohibitively expensive, thereby limiting the installation thereof to the larger, more expensive aircraft. The existing ILS glide slope also has the distinct disadvantage of being usable from only one direction. If landing is required from the opposite direction, a separate ILS glide slope system must be installed. The present ILS glide slope system is also inaccurate for operation below one hundred fifty feet and completely unreliable for elevations below fifty feet. Existing ILS glide slope provisions also have the disadvantage of providing only one glide slope angle which may not be suitable for all aircraft. For example, the small, single-engine aircraft could be provided with a larger margin of safety by increasing the glide slope angle thereby providing a steeper descent which would enhance the clearance of fixed obstructions during the approach whereas the larger aircraft should still be provided with a low, stabilized approach allowing touchdown close to the end of the runway.

As a result of the expense, complexity and weight of the existing ILS glide slope systems, a vast majority of the airports and landing strips are virtually unequipped to provide vertical guidance to an aircraft on final approach to landing. Therefore, the pilot, in making an instrument landing approach into an airport not equipped with ILS, must perform a number of mathematical computations to arrive at the desired rate of descent from his final approach fix to his minimum descent altitude by subtracting the minimum descent altitude from the final approach fix altitude and dividing this by the estimated time required to fly from the final approach fix to the missed approach point or his landing point on the runway. Using the above calculations, the pilot must then rely on his vertical speed indicator for attempting to follow this desired rate of descent. The scaled divisions on the typical vertical speed indicator represent a difference of vertical speed of approximately 100 feet per minute per scale division which could result in a rather large vertical error over the period of time required for making the approach for landing. The computations involved, while not extremely complex, are often being done by a single pilot who at the same time is operating the aircraft under instrument conditions, making errors in simple arithmetic likely. Added to this is the uncertainty as to the accuracy of direction and velocity of the wind which may change during his approach with respect to both time and altitude. Therefore, it is readily apparent that the instrument approach to landing without the benefit of vertical guidance to the aircraft results in an extremely unsafe condition.

SUMMARY OF THE INVENTION

The present invention contemplates a novel aircraft glide slope instrumentation system designed and constructed for overcoming the above disadvantages. The present glide slope instrumentation system utilizes the relatively simple and economical installation of a pair of spaced, non-directional radio beacon transmitters which would fall within the expense budget of a vast majority of the operational airports. The present invention also utilizes a pair of airborne direction finder receivers which are readily available on the market for determining the relative bearing of the two ground-based beacon transmitters and a novel electromechanical means for determining the desired landing approach altitude in real time and for comparing and displaying the difference between the said desired altitude and the true altitude of the aircraft thereby permitting the pilot to devote his efforts to flying the desired glide slope descent without the problem of making involved computations therefor. The present system will allow vertical altitude glide slope guidance for approaching the landing strip from either direction while providing increased sensitivity as the aircraft approaches lower altitudes thereby making the present system usable and accurate down to runway level. The present system will also allow selection of the best glide slope angle for the operation of a particular aircraft. The present system will also provide glide slope information for an existing VHF omni-directional range (VOR) system approaches without any modification of or interference with the existing functioning facility. The present system will also provide glide slope information for existing airborne direction finding (ADF) approaches and at those ILS installations which presently have only localizer functions. The present system will also provide a missed approach point signal to the pilot when he has passed his desired point of touchdown on the landing strip thereby eliminating the need for cockpit calculations to determine when the missed approach point has been reached.

DESCRIPTION OF THE DRAWINGS

Other and further advantageous features of the present invention will hereinafter more fully appear in connection with a detailed description of the drawings in which.

DETAILED DESCRIPTION OF THE INVENTION

Figure 1:
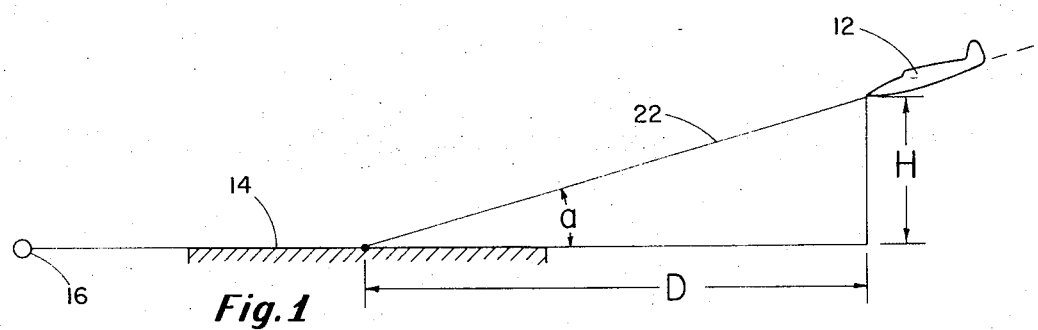
FIG. 1 is an elevational view of an aircraft making an approach at a landing strip equipped with a pair of non-directional radio beacon transmitters embodying the ground-based portion of the present invention.

Referring to the drawings in detail, reference character 10 generally indicates the airborne portion of an aircraft glide slope instrumentation system for use with an altimeter equipped aircraft 12 and a landing strip 14. The instrumentation system comprises a non-directional radio beacon (NDB) transmitter 16 which is ground-based and located on the extension of the center line of the runway and spaced a fixed distance from one end of the said runway. A second substantially identical NDB transmitter 18 is ground-based and located a fixed distance A from the center point 20 of the runway 14 along a line perpendicular to the center line of the runway and intersecting therewith at the point 20.

Figure 2:
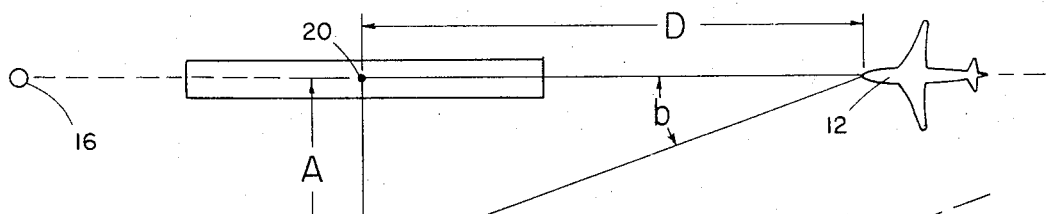
FIG. 2 is a plan view of the approaching aircraft and ground installation of FIG. 1.

Referring now to FIG. 1, reference character 22 depicts the profile view of a desired approach glide slope for the aircraft 12 for effecting touchdown at the center point 20 of the runway 14. Reference character H represents the desired altitude of the aircraft 12 when the said aircraft 12 is a distance D from the touchdown point 20 of the landing strip 14. Reference character $a$ represents the glide slope angle of the glide slope 22 with respect to the landing strip 14. Reference character $b$ represents the difference in relative bearing between the NDB transmitter 16 and the NDB transmitter 18. As the aircraft 12 makes an approach in line with the runway as shown in FIGS. 1 and 2, the difference in relative bearing of the NDB transmitter 16 and the NDB transmitter 18 is the angle $b$. Since D represents the horizontal distance of the aircraft 12 from the touchdown point 20 of the landing strip 14, it is readily apparent that (1) $D = A$ cotangent $b$.

It is also readily seen from FIG. 1 that the desired altitude H of the aircraft 12, when the said aircraft 12 is a horizontal distance D from the touchdown point 20 of the landing strip 14 is represented by:

(2) $H = D$ tangent $a$.

Now, substituting the value for D of equation (1) into equation (2), we obtain (3) $H = A$ cotangent $b$ tangent $a$, and since A is a known distance of the NDB transmitter 18, from the center line of the landing strip 14, and the desired glide slope angle $a$ is a known quantity, we have expressed in equation (3) the desired altitude H of the aircraft in terms of $b$, which is the difference in relative bearing between the NDB transmitters 16 and 18.

The airborne instrumentation system 10 comprises an existing aircraft altimeter 24 having a low torque, synchro transmitter 26 secured to the rotational output shaft of the altimeter 24. In this application, the synchro transmitter 26 would be attached to the "100 foot" shaft 25 of the altimeter 24. The stator output of the synchro transmitter 26 is operably connected to the stator windings of a control transformer 28, the said control transformer 28 having a rotor 30, the output of which is operably connected to the input of a servo amplifier 32. The output of the servo amplifier 32 is operably connected to a servo motor 34 having a rotating shaft 36. The rotor 30 of the control transformer 28 is rigidly secured to the servo motor shaft 36 for rotation of the said rotor 30 with the said shaft 36. An altimeter driven variable resistor 38 having a wiper arm 40 is operably connected to the shaft 36 whereby upon rotation of the said shaft 36 the wiper arm 40 will likewise be rotated thereby varying the resistance of the resistor 38. The resistance of the variable resistor 38 is constructed in such a manner as to be directly proportional to the altitude of the aircraft as determined by the altimeter 24. Therefore, as the altitude of the aircraft 12 changes, the shaft 25 of the altimeter 24 will rotate the rotor 27 of the synchro transmitter 26 thereby applying a voltage change to the stator windings of the control transformer 28. The output of the rotor 30 of the control transformer 28 will then apply a voltage signal to the servo amplifier 32, the output of which will be applied to the servo motor 34. The shaft 36 of the servo motor 34 will then rotate the wiper arm 40 of the variable resistor 38 while simultaneously rotating the rotor 30 of the control transformer 28 until a balance voltage condition is reached in the control transformer 28, thereby varying the resistance $R_{38}$ of the variable resistor 38 in an amount directly proportional to the change in altitude of the aircraft 12.

The airborne instrumentation system 10 also comprises an airborne direction finding (ADF) receiver 42 which is tuned to receive the output signal from the ground-based NDB transmitter 16 for determining the azimuth bearing of the said transmitter 16 with respect to the aircraft 12. The stator coils of a synchro differential 44 are operably connected to the synchro output of the receiver 42. The airborne instrumentation system 10 also comprises a second substantially identical ADF receiver 46 which is tuned to receive the output signal from the NDB transmitter 18. The receiver 46 is provided with a synchro output operably connected to the stator coils of a synchro control transformer 48 having a rotor 50. The output from the rotor 50 is operably connected to the intput of a servo amplifier 52, the output of the said servo amplifier 52 being operably connected to a servo motor 54 having a rotating shaft 56. The synchro differential 44 has a rotor 58 which is rigidly secured to the shaft 56 of the servo motor 54. The rotor 50 of the synchro control transformer 48 is also rigidly secured to the shaft 56 of the servo motor 54. Therefore, the servo output of the receiver 46 will control the rotor position of the synchro differential 44 such that the voltage output of the rotor 58 of the differential 44 is proportional to the difference between the relative bearing of the NDB transmitters 16 and 18 which is depicted by the angle $b$ as shown in FIG. 2.

The voltage output of the rotor 58 is operably connected to the stator coils of a control transformer 60 having a rotor 62. The output of the rotor 62 is operably connected to the input of a servo amplifier 64, the output of which is operably connected to a servo motor 66 having a rotational shaft 68. The rotor 62 of the control transformer 60 is rigidly secured to the servo motor shaft 68 for rotation therewith. The shaft 68 of the servo motor 66 is also directly connected to the wiper arm 70 of a specially wound non-linear potentiometer 72 and the wiper arm 74 of a potentiometer 76 for purposes that will be hereinafter set forth. It is readily seen that upon a change in the difference in relative bearing $b$ between the NDB transmitters 16 and 18, a change in voltage will be received by the stator coils of the control transformer 60 thereby resulting in an output signal to the servo amplifier 64 which actuates the servo motor 66, which in turn rotates the shaft 68 thereof by an amount proportional to the change in the relative bearing angle $b$.

The airborne instrumentation system 10 is provided with direct current electrical power from the existing aircraft power supply generally indicated by reference character 78. The variable resistor 38 is connected to the negative output terminal of the power supply 78. An airport elevation variable resistor 80 is connected in series with the variable resistor 38, the said variable resistor 80 having a wiper arm 82 which is operably connected to a rotational shaft 84 of a landing strip elevational display unit 86. The shaft 84 is provided with a hand turn knob 88 secured thereto whereby upon rotation of the shaft 84, the elevation of the landing strip 14 above seal level may be entered into the display unit 86 while simultaneously varying the resistance $R_{80}$ of the variable resistor 80 by an amount inversely proportionate to the elevation of the landing strip 14 with respect to sea level. A landing strip length variable resistor 90 having a wiper arm 92 is connected in series with the resistors 38 and 80, the said wiper arm 92 being connected to the rotating shaft 94 of a numerical display unit 96. The shaft 94 is provided with a hand turn knob 98 secured thereto whereby upon rotation of the shaft 94, the length L of the landing strip 14 may be entered into the display unit 96 while simultaneously varying the resistance $R_{90}$ of the variable resistor 90 by an amount directly proportionate to the length L of the landing strip 14. A fixed resistor 100 is connected to the positive output terminal of the power supply 78 and in series with the variable resistors 38, 80 and 90.

The potentiometer 72 has a nonlinear resistance element 102 having one end thereof connected to the negative output terminal of the power supply 78 through a fixed resistor 104 and one pole of a double pole reverse polarity switch SW1 connected in series therewith. The opposite end of the non-linear resistive element 102 is operably connected to the positive output terminal of the power supply 78 through a fixed resistor 106 and the other pole of the switch SW1 connected in series therewith. The wiper arm 70 of the potentiometer 72 is electrically connected to one side of a current sensitive galvanometer type glide slope meter 108, the opposite side of the said meter 108 being operably connected to the center tap contact of a plurality of potentiometers 110, 112, 114, 116 and 118 having ganged wiper arms 120, 122, 124, 126 and 128, respectively, each of the said wiper arms being connected to one of the contacts of a single pole five throw switch SW2, the pole of the switch SW2 being connected to the positive output terminal of the power supply 78 through the fixed resistor 100. The pole of the switch SW2 is mechanically connected to the rotational output shaft 94 of the numerical display unit 96. The ganged wiper amrs 120, 122, 124, 126 and 128 are mechanically connected to the rotational shaft 68 of the servo motor 66 for purposes that will be hereinafter set forth.

Figure 4:
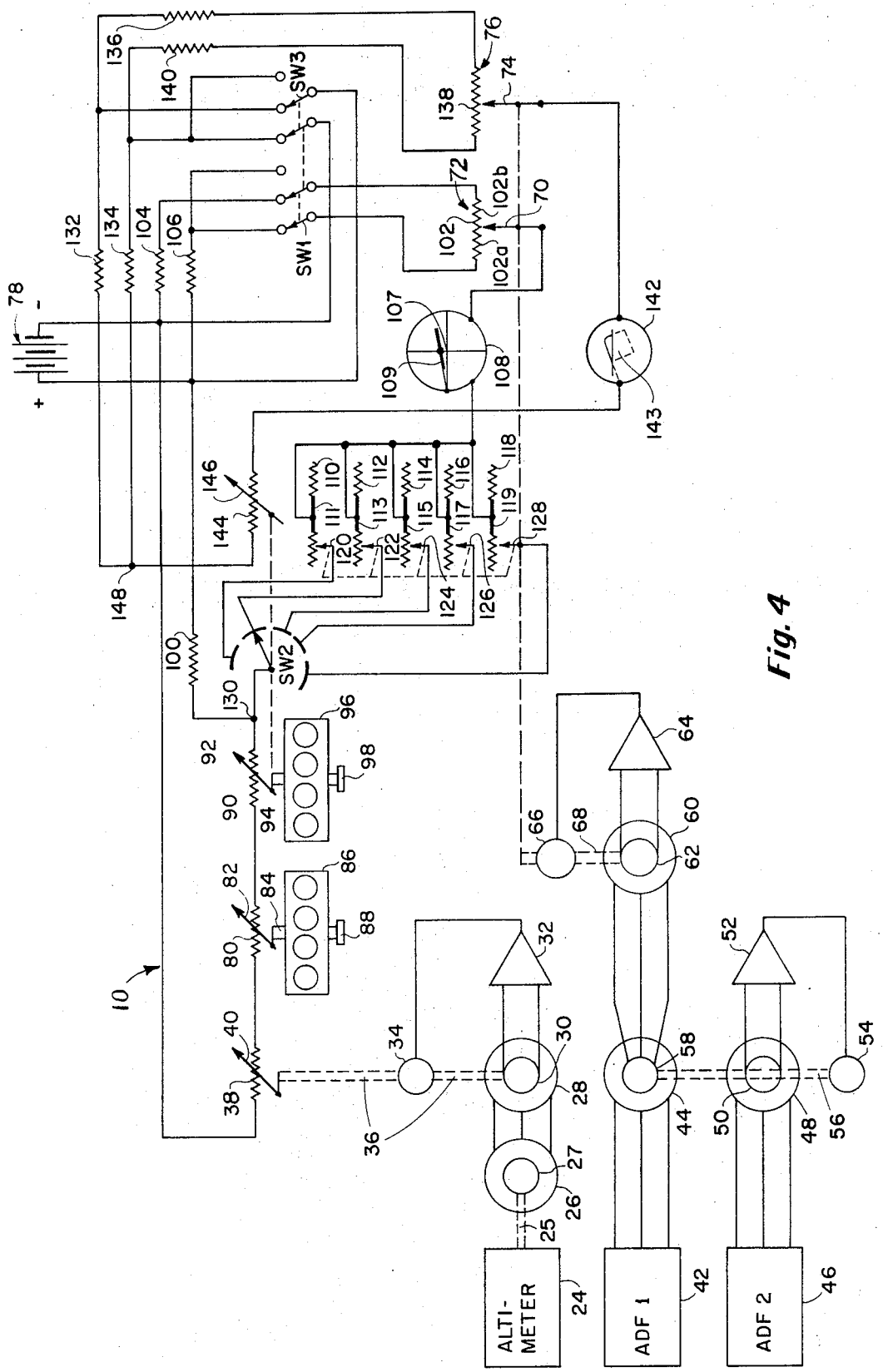
FIG. 4 is an electro-mechanical schematic diagram of the aircraft installed equipment embodying the invention.

The glide slope meter 108 is provided with a center reference point 107 and a glide slope needle indicator 109 which deflects upwards as shown in FIG. 4 when current flows from the wiper arm 70 of the potentiometer 72 of the junction point 130 between the variable resistor 90 and the fixed resistor 100. The said indicator 109 deflects downwards when current flows from the junction point 130 to the said wiper arm 70 for a purpose that will be herinafter set forth.

The potentiometer 110 is provided with a low resistance shunt section 111 which is operably connected to the glide slope meter 108. Likewise, the potentiometer 112 is provided with a similar low resistance shunt section 113 which is somewhat longer than the shunt section 111 of the potentiometer 110, the said shunt section 113 being also connected to the glide slope meter 108. The potentiometers 114, 116 and 118 are also provided with shunt sections 115, 117 and 119, respectively, each of the said shunt sections being progressively longer than the next previous one. Therefore, in operation, when approaching a short landing strip for landing, the switch SW2 will be rotated by the shaft 94 to the position selecting the potentiometer 110, thereby providing the resistance of the said potentiometer 110 in series with the glide slope meter 108 which decreases the sensitivity of the said meter 108, as the aircraft 12 approaches the landing strip 14 along the glide slope 150, the relative bearing $b$ between the NDB transmitters 16 and 18 increases and the rotation of the servo motor shaft 68 causes the wiper arm 120 of the potentiometer 110 to approach the shunt section 111, thereby lowering the resistance of the potentiometer which in turn increases the sensitivity of the glide slope meter 108. It is readily seen that maximum sensitivity of the glide slope meter 108 is attained when the aircraft 12 is near the touchdown point 152. When making a landing approach at a longer landing strip, the switch SW2 will be rotated to select one of the other potentiometers 112 through 118 which has a longer shunt section associated therewith. Therefore, the wiper arm of the selected potentiometer will reach the shunt section thereof when the relative bearing angle $b$ is smaller than that hereinbefore described for the potentiometer 110. However, since the touchdown point 152 for a longer landing strip corresponds to a smaller angle $b$, the said increase in sensitivity of the glide slope meter 108 with respect to altitude is substantially the same as that provided by the potentiometer 110 for a shorter landing strip.

It is readily apparent that the foregoing describes a divided bridge circuit, one branch thereof consisting of the altimeter driven variable resistor 38, the airport elevation variable resistor 80, the runway length variable resistor 90, and the fixed resistor 100 having resistance $R_{100}$, the other branch consisting of the fixed resistor 104 having resistance $R_{104}$, the nonlinear resistance element 102 of the potentiometer 72 and the fixed resistor 106 having resistance $R_{106}$. The circuit is bridged from a junction point 130 between the fixed resistor 100 and the variable resistor 90 by the plurality of potentiometers, 110 through 118, their associated selector switch SW2 and the glide slope meter 108 connected in series therewith to the wiper arm 70 of the non-linear potentiometer 72.

For purpose of description, the wiper arm 70 of the potentiometer 72 intercepts the non-linear resistive element 102, in effect dividing the said element into variable resistance elements 102a and 102b having resistance $R_{102a}$ and $R_{102b}$, respectively, the element 102a being connected to the resistor 106 and 102b being connected to the resistor 104. The non-linear resistive element 102 is wound in a manner such that the ratio of the resistance of the element 102a to that of 102b is directly proportional to the desired altitude of the aircraft 12 along the glide path 22 and hence directly proportional to the cotangent of the relative bearing angle b between the NDB transmitters 16 and 18 as hereinbefore set forth in equation (3). Since the total resistance of the variable resistors 38, 80 and 90 is directly proportional to the true altitude of the aircraft 12 at any time and the voltage potential difference between the junction point 130 and the wiper arm 70 of the potentiometer 72 will be zero when (4) $(R_{90} + R_{80} + R_{38})/R_{100} = (R_{104} + R_{102b})/(R_{106} + R_{102a})$, the bridge will become unbalanced only when the aircraft 12 is not at its proper altitude with respect to the glide slope 22.

The airborne instrumentation system 10 also comprises a missed approach flag circuit having a fixed resistor 132 connected to the positive output terminal of the power supply 78 through one pole of a double pole reverse polarity switch SW3 connected in series therewith and a fixed resistor 134 connected to the negative output terminal of the power supply 78 through the other pole of the switch SW3. A fixed resistor 136 is connected to the positive output terminal of the power supply 78 through one pole of the switch SW3. The potentiometer 76 has a resistive element 138 which is connected in series with the fixed resistor 136. A fixed resistor 140 is connected to the negative output terminal of the power supply 78 through the other pole of the switch SW3, the said resistor 140 being connected in series with the resistive element 138 of the potentiometer 76 and the fixed resistor 136. A current sensitive missed approach flag display meter 142 is connected to the wiper arm 74 of the potentiometer 76 and connected in series with a variable resistor 144 having a wiper arm 146, the said variable resistor 144 being connected to the juncture 148 between the resistors 132 and 144. The wiper arm 146 of the variable resistor 144 is mechanically connected to the rotational shaft 94 of the numerical display unit 96. The two poles of the reverse polarity switch SW3 are ganged to the two poles of the reversed polarity switch SW1 for simultaneous operation of the switches SW1 and SW2 for purposes that will be hereinafter set forth. The flag display meter 142 is provided with a flag indicator 143 which is hidden from view until the electrical current through the said meter 142 reaches a predetermined amount at which time the said flag indicator 143 is rotated into view thereby indicating the aircraft 12 is at the missed approach point.

It is apparent that the foregoing description of the missed approach flag circuit describes a divided bridge circuit having one branch thereof made up of the fixed resistor 132 and the fixed resistor 134 connected in series therewith, the other branch being made up of the fixed resistor 136, the resistive element 138 of the potentiometer 76 and the fixed resistor 140. The branches are bridged by the variable resistor 144 connected to the juncture point 148 between the fixed resistors 132 and 134, and the missed approach flag meter 142 connected to the wiper arm 74 of the potentiometer 76, the said meter 142 being in series with the variable resistor 144.

Figure 3:
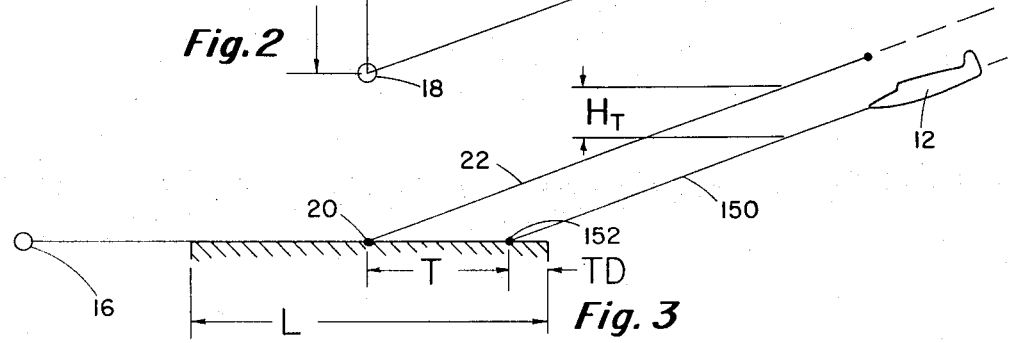
FIG. 3 is an elevational view of an aircraft making an alternative landing approach on the landing strip equipped with the pair of non-directional beacon transmitters of FIG. 1.

Referring now to FIG. 3, reference character 150 depicts a glide slope path which is parallel to the glide slope path 22 but disposed vertically downward therefrom by an amount $H_T$ thereby moving the touchdown point 20 on the landing strip 14 back toward the approach end of the landing strip by an amount T to a new point 152. The adjustment of the glide slope 22 to the new glide slope 150 is accomplished by changing the variable resistor 90 directly proportionately to the length L of the landing strip 14. Therefore, the desired distance TD of the touchdown point from the approach end of the runway is equal to one-half the length of the runway less the set back distance T of the touchdown point from the center point 20 of the landing strip 14. Therefore, the resistance of the variable resistor 90 is directly proportional to one-half the length L of the landing strip 14 less the desired touchdown distance TD from the approach end of the landing strip 14.

In operation, upon approaching the landing strip 14 for a landing, the pilot will rotate the knob 88 until the elevation above sea level of the landing strip 14 appears in the numerical display 86 thereby adjusting the resistance of the variable resistor 80 inversely proportionately to the said elevation of the landing strip 14 above sea level. The pilot of the aircraft 12 will then rotate the knob 98 until the length of the landing strip 14 appears in the numerical display 96 thereby adjusting the resistance of the variable resistor 90 directly proportionately to the length of the runway which will establish the touchdown point 152 on the landing strip 14 by an amount TD from the approach end of the landing strip as will be hereinafter set forth. The rotation of the knob 98 and its associated shaft 94 will in turn rotate the pole of the switch SW2 thereby selecting one of the potentiometers 110 through 118 to be connected in series with the glide slope meter 108. Simultaneously, operation of the knob 98 with associated shaft 94 will adjust the resistance of the variable resistor 144 directly proportionate to the length of the runway for purposes that will be hereinafter set forth. At this point the pilot of the aircraft 12 has established the approach glide slope 150 which terminates at the touchdown point 152 which is a distance TD from the approach end of the landing strip 14. At this point the ADF receivers 42 and 46 are placed into operation for receiving the output signal of the ground based NDB transmitters 16 and 18, respectively. The ganged switches SW1 and SW3 are positioned as shown in FIG. 4. The ADF receivers 42 and 46 upon locking onto the NDB transmitters 16 and 18, respectively, will produce a combined servo output thereby rotating the shaft 68 of the servo motor 66 to a position corresponding to the difference in relative bearing between the NDB transmitters 16 and 18 which will in turn position the wiper arms of the potentiometers 110 through 118 to the outer end of the resistive elements of the said potentiometers while simultaneously moving the wiper arms 70 of the potentiometer 72 to a point adjacent to the end of the non-linear resistive element 102 adjacent to the fixed resistor 106. The positioning of the servo motor shaft 68 will also position the wiper arm 74 of the potentiometer 76 near the edge of the resistive element 138 adjacent to the fixed resistor 140. The altimeter 24 will produce a servo output thereby rotating the shaft 36 which in turn will vary the resistance of the variable resistor 38 directly proportional to the altitude of the aircraft 12 above sea level.

Therefore, the total resistance of the variable resistors 38, 80 and 90 is directly proportional to the true altitude of the aircraft 12 above the landing strip 14 while the desired altitude of the aircraft 12 is directly proportional to $R_{102b}$ and inversely proportional to $R_{102a}$. The resistance of the fixed resistor 100 is constructed to be equal to the resistance of the fixed resistor 106. The variable resistors 38, 80, 90 and the fixed resistor 104 and the non-linear potentiometer 72 are constructed so that if the aircraft is at an elevation equal to the desired elevation for following the glide slope path 150, the voltage level at the point 130 is equal to the voltage level at the point of contact of the wiper arm 70 with the resistive element 102 of the potentiometer 72 allowing no current to flow through the glide slope meter 108 thereby centering the indicator 109 as hereinbefore set forth. However, if the true altitude of the aircraft 12 is above the desired altitude for the glide slope 150 the resistance of the altimeter driven variable resistor 38 will increase thereby unbalancing the bridge and creating a higher voltage level at the junction point 130 than that at the wiper arm 70 of the variable potentiometer 72 which, in turn, creates a current through the glide slope meter 108 thereby positioning the indicator 109 thereof below the center point 107 of the meter indicating to the pilot that his true altitude is above that of the desired altitude. The pilot may correct the situation by lowering the altitude of the airplane which in effect lowers the resistance of the variable resistor 38 by a proportionate amount until the glide slope meter indicator 109 has centered again. On the other hand, if the altitude of the aircraft 12 is below the desired altitude of the glide slope 150 the resistance of the altimeter driven variable resistor 38 will decrease thereby unbalancing the bridge in the opposite direction which in turn creates a current flow from the wiper arm 70 of the potentiometer 72 through the glide slope meter 108 to the junction point 130 thereby causing the glide slope meter indicator 109 to rise above the center point 107 thereof as shown in FIG. 4 indicating to the pilot that his true altitude is below that of the desired altitude. Again, he may correct the situation by increasing the altitude of the aircraft thereby increasing the resistance of the variable resistor 38 by a proportionate amount until the indicator 109 of the glide slope meter 108 is again centered.

As the aircraft 12 approaches the landing strip 14 along the glide path 150, the difference in relative bearing between the NDB transmitter 16 and the NDB transmitter 18 will increase thereby resulting in a rotation of the servo motor shaft 68 which in turn causes the wiper arm 70 of the potentiometer 72 to move toward the end of the resistive element 102 adjacent to the fixed resistor 104. At the same time, as the aircraft is approaching the landing strip 14, along the glide path 150, it is decreasing in altitude thereby resulting in a reduction of resistance of the variable resistor 38. While the said aircraft is following the glide slope 150 the potential difference between the junction point 130 and the wiper arm 70 of the potentiometer 72 will be zero thereby centering the indicator of the glide slope meter 108 indicating that the true altitude of the aircraft is equal to the desired altitude along the glide path 150. The pilot will therefore fly his aircraft in a manner that will keep the indicator of the glide slope meter 108 centered thereby maintaining the desired rate of descent.

As the aircraft 12 approaches the landing strip 14, the rotational output servo motor shaft 68 will continuously move the set of ganged wiper arms 120 through 128 of the potentiometers 110, 112, 114, 116 and 118, respectively, toward the center point shunt section 111, 113, 115, 117 and 119, respectively, thereby continuously increasing the amount of current flow allowable through the glide slope meter 108 which, in turn, steadily increases the sensitivity of said glide slope meter 108 as the aircraft 12 descends.

Simultaneously, as the aircraft 12 approaches the landing strip 14 the wiper arm 74 of the potentiometer 76 will be steadily approaching the end of the resistive element 138 adjacent to the fixed resistor 136 thereby balancing the missed approach flag circuit which in turn steadily decreases the current through the flag display meter 142 such that when the aircraft is horizontally adjacent to the touchdown point 152, the current flow through the missed approach flag meter 142 will be sufficiently small for movement of the flag indicator 143 thereof into a visible position thereby indicating to the pilot that he is at or adjacent to a designated point with respect to the touchdown point 152. As hereinbefore set forth, the resistance of the variable resistor 144 connected in series with the flag display meter 142 is adjusted in accordance with the length of the runway and directly proportional thereto. It is therfore readily apparent that if the landing strip 14 is relatively short, the resistance of the resistor 144 will be set near its minimum resistance thereby preventing the missed indicator flag from moving to a visible position until the aircraft is near its touchdown point. While, on the other hand, if the length of the landing strip 14 is extremely long, the resistance of the variable resistor 144 will be set near its maximum thereby increasing the sensitivity of the missed indicator flag meter 142 which in turn allows the said flag indicator 143 to be displayed as the aircraft passes the said designated point with respect to the desired touchdown point on the long runway.

Figure 5:
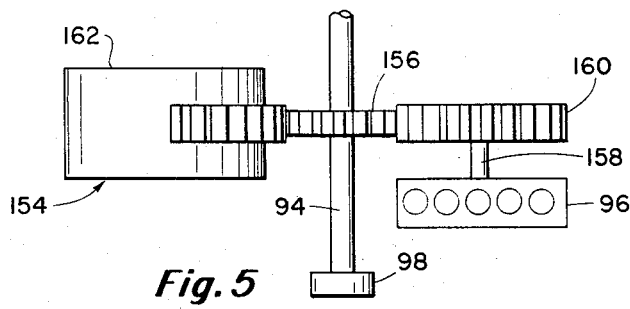
FIG. 5 is an elevational view of a gear arrangement for setting into the system the appropriate runway length.
Figure 6:
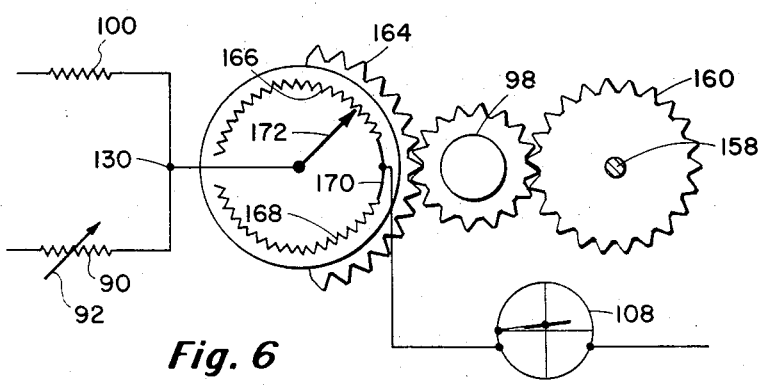
FIG. 6 is an electro-mechanical plan view of the gear arrangement of FIG. 5.

Referring now to FIGS. 5 and 6, reference character 154 generally indicates an alternate potentiometer which may be substituted in the place of the plurality of potentiometers 110 through 118. The rotating shaft 94 having the knob 98 secured thereto is provided with a gear 156 rigidly secured thereto while the numerical display 96 is provided with a rotational shaft 158 secured thereto, the said rotational shaft 158 being provided with a gear 160 which is disposed in meshing engagement with the gear 156. The potentiometer 154 comprises a substantially cylindrical housing 162 having a plurality of gear teeth 164 disposed part way around the outer periphery of the said housing 162 and in meshing engagement with the gear 156. The potentiometer 154 also comprises a pair of arcuate shaped resistive elements 166 and 168 which are operably connected to a shunt section 170 disposed therebetween. The center point of the shunt section 170 is electrically connected to the glide slope meter 108. The potentiometer 154 is also provided with a wiper arm 172 which is electrically connected to the junction point 130 between the variable resistor 90 and the fixed resistor 110, the said wiper arm 172 being mechanically connected to the output rotational shaft 68 of the servo motor 66. Therefore, when the knob 98 with attached rotational shaft 94 is rotated, thereby rotating the gear 156, the gear 160 will in turn rotate the input shaft 158 of the numerical display 96 thereby entering the desired runway length into the said numerical display unit 96. Simultaneously therewith, the rotation of the gear 156 will cause rotation of the housing 162 of the potentiometer 154 thereby positioning the resistive elements of the potentiometer 154 to a position whereby upon rotation of the wiper arm 172 by the servo motor shaft 68, the said wiper arm 172 will reach the shunt section 170 of the potentiometer 154 at the appropriate time to provide maximum elevation sensitivity to the glide slope meter 108. It is noted that upon approaching the landing strip from the opposite direction rotation of the housing 162 would be in the opposite direction by a like amount for a given landing strip length thereby requiring a separate gearing arrangement (not shown) for entering the landing strip length into the display 96.

When the aircraft 12 is approaching the landing strip 14 from the opposite direction to that hereinbefore described, it is readily apparent that on the approach leg, the NDB transmitter 16 will be behind the aircraft and the difference in relative bearing between the NDB transmitters 16 and 18 will be (180° − b) greater than when the aircraft 12 is approaching from the direction shown in FIGS. 1, 2 and 3. Therefore, the difference in relative bearing between the NDB transmitters 16 and 18 will decrease as the aircraft 12 approaches the landing strip 14. It is therefore necessary for the pilot, when approaching from the opposite direction to reverse the polarity of the non-linear potentiometer 72 by actuating the switch SW1. Since the switch SW1 is ganged to the switch SW3, the said switch SW3 is actuated, thereby reversing the polarity of the power supply 78 with respect to the missed approach divider circuit. The pilot then proceeds to set the landing strip elevation into the numerical display 86 and the runway length into the numerical display 96 and fly his aircraft in a manner that will keep the glide slope indicator 109 centered within the glide slope meter 108 thereby maintaining the desired rate of descent to a touchdown point adjacent to the opposite end of the runway from that shown in FIGS. 1, 2 and 3.

From the foregoing, it will be apparent that the present invention provides an aircraft glide slope instrumentation system particularly designed and constructed to provide accurate vertical guidance information to the pilot of an aircraft upon making an approach for landing. The novel aircraft glide slope instrumentation system is also provided with means to increase the sensitivity of the said glide slope information displayed to the pilot as the aircraft descends to the point of landing thereby providing maximum vertical guidance sensitivity at the landing strip level. In addition thereto, the present invention also provides a missed approach point signal to the pilot when he has horizontally passed his desired point of touchdown on the landing strip. The novel aircraft glide slope instrumentation system is simple and efficient in operation and economical and reliable in construction.

Whereas the present invention has been described in particular relation to the drawings attached hereto, it should be understood that other and further modifications, apart from those shown or suggested herein, may be made within the spirit and scope of this invention. For example, three ground based beacon transmitters may be utilized instead of two arranged as follows: The first NDB transmitter placed the same as NDB transmitter 16 of FIG. 1 and 2, the second is placed a distance A from the landing strip on a line perpendicular to and intersecting therewith at the touchdown point at one end of the landing strip and the third placed a distance A from the landing strip on a line perpendicular to and intersecting therewith at the touchdown point near the opposite end of the landing strip. The pilot would then utilize the first and second transmitters when approaching from one direction and the first and third when approaching from the other direction thereby eliminating the need for landing strip length adjustment means hereinbefore described.

What is claimed is:

1. An aircraft glide slope instrumentation system for providing vertical guidance to an aircraft equipped with altimeter means for landing at a landing strip, the instrumentation system comprising a pair of landing strip based transmitter beacons spaced a fixed distance apart, a first direction finding receiver carried by the aircraft for receiving the output of one of the transmitter beacons and determining the azimuth bearing thereof, a second direction finding receiver carried by the aircraft for receiving the output of the other transmitter beacon and determining the azimuth bearing thereof, distance computer means carried by the aircraft and operably connected to the two receivers for determining the horizontal distance between the aircraft and the landing strip based upon the difference in relative bearing between the two transmitter beacons when the said aircraft is in longitudinal alignment with the center line of said landing strip by use of suitable localizer means, altitude computing means carried by the aircraft and operably connected to the distance computer means for determining the desired landing approach altitude of the aircraft at any time during the approach thereof and glide slope display means operably connected to the altitude computing means and the altimeter means for displaying the difference between the desired landing approach altitude and the true altitude of the aircraft with respect to the landing strip.

2. An aircraft glide slope instrumentation system as set forth in claim 1 wherein the landing strip based transmitter beacons comprise a first nondirectional radio beacon transmitter disposed on an extension of the center line of the landing strip and spaced a fixed distance from one end of the said landing strip and a second nondirectional radio beacon transmitter disposed a fixed distance from the mid-point of the landing strip on a line perpendicular to and interesecting with the center line of the landing strip at the said mid-point of the landing strip.

3. An aircraft glide slope instrumentation system as set forth in claim 1 wherein each of the direction finding receivers comprises an airborne direction finding receiver having servo voltage outputs corresponding to the aximuth bearing of the ground based transmitter beacon to which it is tuned.

4. An aircraft glide slope instrumentation system as set forth in claim 3 wherein the distance computer means comprises differential servo means operably connected to the servo voltage outputs of the direction finding receivers for determining the difference in relative azimuth bearing between the ground based transmitter beacons and a potentiometer means having a specially wound nonlinear variable resistive element and a movable wiper arm in movable contact with the said variable resistive element, the said wiper arm being operably connected to the output of the differential servo means, the movement of the said wiper arm being directly proportional to the difference in relative bearing between the transmitter beacons which is directly proportional to the arc contangent of the horizontal distance from the aircraft to the landing strip.

5. An aircraft glide slope instrumentation system as set forth in claim 4 wherein the altitude computing means comprises a resistance means operably connected to the potentiometer means for determining the desired landing approach altitude of the aircraft above the landing strip at any time during the approach thereof based upon the horizontal distance of the said aircraft from the landing strip.

6. An aircraft glide slope instrumentation system as set forth in claim 5 wherein the aircraft altimeter means comprises an altimeter for measuring the altitude of the aircraft above sea level, the said altimeter having voltage servo output directly proportional to the said altitude above sea level, altimeter driven variable resistor means, altimeter servo means operably connected to the output of the altimeter and the variable resistor means for varying the resistance of the said variable resistor means directly proportionate to the altitude of the aircraft above sea level, manually adjustable landing strip elevation variable resistor means operably connected to the altimeter driven variable resistor means for adjusting the total resistance of the altimeter driven variable resistor means and the landing strip elevation variable resistor means whereby the said total resistance is directly proportional to the altitude of the aircraft above the landing strip.

7. An aircraft glide slope instrumentation system as set forth in claim 6 wherein the glide slope display means comprises a current sensitive galvanometer type movemeter having a movable display indicator, the movement thereof being directly proportional to the difference between the desired landing approach altitude of the aircraft and the true altitude of the aircraft with respect to the landing strip.

8. An aircraft glide slope instrumentation system as set forth in claim 7 wherein the altitude computing means is provided with landing strip length adjustment means for adjusting the landing point with respect to the mid-point of the landing strip to compensate for landing strips of various lengths.

9. An aircraft glide slope instrumentation system as set forth in claim 7 wherein automatic glide slope sensitivity control means is operably connected to the glide slope display means for varying the sensitivity of the said glide slope display means inversely proportional to the desired landing approach altitude of the aircraft above the landing strip.

10. An aircraft glide slope instrumentation system as set forth in claim 4 wherein the distance computer means also comprises a missed approach point indication means for indicating when the aircraft has passed the said missed approach point.

11. An aircraft glide slope instrumentation system as set forth in claim 10 wherein the missed approach point indication means comprises a plurality of resistors arranged in a divided bridge circuit, a current sensitive flag display meter connected across the said bridge circuit, a bridge balancing potentiometer having a resistive element connected to one branch of the bridge circuit, and a movable wiper arm electrically connected to the flag display meter, the said wiper arm being operably connected to the output of the differential servo means, the movement of the said wiper arm being effected by the said differential servo means and directly proportional to the difference in relative bearing between the transmitter beacons for decreasing the current through the flag display meter whereby upon reaching the missed approach point, the said flag display meter indicates that the aircraft has passed the said missed approach point.

12. An aircraft glide slope instrumentation system as set forth in claim 11 wherein missed approach sensitivity adjustment means is operably connected to the flag display meter for adjusting the missed approach indication thereof longitudinally with respect to the landing strip.

13. An aircraft glide slope instrumentation system for providing vertical guidance to an aircraft equipped with altimeter means for landing at a landing strip, the instrumentation system comprising a pair of landing strip based transmitter beacons spaced a fixed distance apart, the first said beacon being disposed in longitudinal alignment with the landing strip and spaced a fixed distance from one end thereof and the second beacon disposed a fixed distance from the mid-point of the landing strip on a line perpendicular to the center line of the landing strip and intersecting the said landing strip at the mid-point thereof; a first direction finding receiver carried by the aircraft for receiving the output of the first transmitter beacon and determining the azimuth bearing thereof, a second direction finding receiver carried by the aircraft for receiving the output of the second transmitter beacon for determining the azimuth bearing thereof, each of the said receivers having a servo output corresponding to the azimuth bearing of the transmitter beacon to which it is tuned; distance computer means carried by the aircraft and comprising differential servo means operably connected to the servo outputs of the direction finding receivers for determining the difference in relative azimuth bearing between the said transmitter beacons, the output of the said differential servo means being directly proportional to the difference in relative azimuth bearing between the transmitter beacons, a first potentiometer means having a specially wound non-linear resistive element and a movable wiper arm in movable contact with the said non-linear resistive element, the said wiper arm being operably connected to the output of the differential servo means, the movement of the said wiper arm being directly proportional to the difference in relative azimuth bearing between the transmitter beacons for determining horizontal distance between the aircraft and the landing strip based upon the difference in relative bearing between the two transmitter beacons when the said aircraft is in longitudinal alignment with the center line of said landing strip by use of suitable localizer means; a missed approach point indicator comprising a plurality of resistors arranged in a divided bridge circuit, a current sensitive flag display meter connected across the said bridge circuit, a bridge balancing potentiometer having a resistive element connected to one branch of the bridge circuit and a movable wiper arm electrically connected to the flag display meter, the said wiper arm being operably connected to the output of the differential servo means, the movement of the said wiper arm being directly proportional to the difference in relative azimuth bearing between the transmitter beacons for providing indication when the aircraft has passed the missed approach point; altitude computing means carried by the aircraft and connected to the distance computer means, the said altitude computing means comprising a plurality of resistor means operably connected to the distance computer means in a divided bridge circuit, for determining the desired landing approach altitude of the aircraft above the landing strip at any time during the approach thereof based on the horizontal distance of the said aircraft from the landing strip; and glide slope display means comprising a current sensitive galvanometer type meter having a movable display indicator, the said glide slope display meter being operably connected to the altitude computing means and the altimeter means, the movement of the movable display indicator being directly proportional to the difference between the desired landing approach altitude of the aircraft and the true altitude of the aircraft with respect to the landing strip.

14. An aircraft glide slope instrumentation system for providing vertical guidance to an aircraft equipped with altimeter means for landing at a landing strip, the instrumentation system comprising at least two landing strip based transmitter beacons spaced a fixed distance apart, a first direction finding receiver carried by the aircraft for receiving the output of one of the transmitter beacons and determining the azimuth bearing thereof, a second direction finding receiver carried by the aircraft for receiving the output of one of the other transmitter beacons and determining the azimuth bearing thereof, distance computer means carried by the aircraft and operably connected to the two receivers for determining the horizontal distance between the aircraft and the landing strip based upon the difference in relative bearing between the two transmitter beacons when the said aircraft is in longitudinal alignment with the center line of said landing strip by use of suitable localizer means, altitude computing means carried by the aircraft and operably connected to the distance computer means for determining the desired landing approach altitude of the aircraft at any time during the approach thereof and glide slope display means operably connected to the altitude computing means and the altimeter means for displaying the difference between the desired landing approach altitude and the true altitude of the aircraft with respect to the landing strip.

* * * * *